United States Patent
Choi et al.

(10) Patent No.: US 12,287,977 B2
(45) Date of Patent: Apr. 29, 2025

(54) STORAGE DEVICE FOR MANAGING BUFFER STORING A LOGICAL TO PHYSICAL MAPPING UNIT, AND METHOD FOR OPERATING THE SAME

(71) Applicant: SK hynix Inc., Icheon-si (KR)

(72) Inventors: Sae Gyeol Choi, Icheon-si (KR); Hye Mi Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/402,721

(22) Filed: Jan. 2, 2024

(65) Prior Publication Data
US 2024/0319894 A1   Sep. 26, 2024

(30) Foreign Application Priority Data
Mar. 24, 2023   (KR) .................. 10-2023-0038442

(51) Int. Cl.
   *G06F 3/06*   (2006.01)
(52) U.S. Cl.
   CPC .......... *G06F 3/0631* (2013.01); *G06F 3/0604* (2013.01); *G06F 3/0634* (2013.01); *G06F 3/0656* (2013.01); *G06F 3/0679* (2013.01)

(58) Field of Classification Search
   CPC .... G06F 3/0631; G06F 3/0634; G06F 3/0679; G06F 3/0604; G06F 3/0656
   See application file for complete search history.

(56) References Cited

U.S. PATENT DOCUMENTS

| | | | |
|---|---|---|---|
| 2015/0378893 A1 | 12/2015 | Atkisson et al. | |
| 2019/0004944 A1* | 1/2019 | Widder | G06F 12/0246 |
| 2020/0151109 A1* | 5/2020 | Cho | G06F 12/1009 |
| 2021/0263852 A1* | 8/2021 | Seok | G06F 12/0891 |
| 2021/0263864 A1* | 8/2021 | Hanna | G06F 3/0631 |
| 2022/0012174 A1* | 1/2022 | Seok | G06F 3/061 |

FOREIGN PATENT DOCUMENTS

KR   10-2016-0066188 A   6/2016

* cited by examiner

*Primary Examiner* — Mark A Giardino, Jr.

(57) ABSTRACT

A storage device may dynamically allocate, to a buffer, at least one among M number of buffer units each capable of storing at least one of a plurality of L2P mapping units. When receiving, from an external device, a mapping unit command requesting one or more target L2P mapping units among the plurality of L2P mapping units, the storage device may store the target L2P mapping units in the buffer before transmitting the target L2P mapping units to the external device.

14 Claims, 12 Drawing Sheets

STORAGE DEVICE FOR MANAGING BUFFER STORING A LOGICAL TO PHYSICAL MAPPING UNIT, AND METHOD FOR OPERATING THE SAME

CROSS-REFERENCE TO RELATED APPLICATION

The present application claims priority under 35 U.S.C. § 119(a) to Korean Patent Application No. 10-2023-0038442 filed in the Korean Intellectual Property Office on Mar. 24, 2023, which is incorporated herein by reference in its entirety.

BACKGROUND

1. Technical Field

Various embodiments generally relate to a storage device which manages a buffer that stores a logical to physical (L2P) mapping unit, and a method for operating the same.

2. Related Art

A storage device is a device for storing data according to a request from an external device such as a computer, a mobile terminal (e.g., a smart phone or tablet), or the like.

A storage device may include a memory for storing data and a controller for controlling the memory. The memory may be a volatile memory or a non-volatile memory. The controller may receive a command from an external device (i.e., a host), and execute or control operations to read, write, or erase data in the memory included in the storage device, according to the received command.

In order to improve the performance of a read operation, the storage device may transmit mapping information between a logical address and a physical address to the external device according to a request of the external device. The storage device may use a buffer to temporarily store the mapping information to be transmitted to the external device.

SUMMARY

Various embodiments of the disclosed technology are directed to providing a storage device capable of minimizing performance degradation related to buffer size and usage, and a method for operating the same.

In addition, various embodiments of the disclosed technology are directed to providing a storage device capable of more efficiently managing L2P mapping units stored in a buffer, and a method for operating the same.

In an embodiment, a storage device may include: (i) a memory configured to store a plurality of L2P (logical-to-physical) mapping units each indicating a mapping relationship between a logical address section and a physical address section; and (ii) a controller configured to allocate, to a buffer, at least one from among an M (M is a natural number of 2 or greater) number of buffer units, each buffer unit capable of storing at least one of the plurality of L2P mapping units, and configured to store one or more target L2P mapping units, from among the plurality of L2P mapping units, in the buffer before transmitting the target L2P mapping units to an external device, when the controller receives a mapping unit command requesting the target L2P mapping units from the external device.

The controller may set a state value of the buffer to one of M number of state values respectively corresponding to the M number of buffer units, and, when storing a first target L2P mapping unit from among the target L2P mapping units in the buffer, may store the first target L2P mapping unit in a target buffer unit corresponding to the state value of the buffer.

In an embodiment, a method for operating a storage device may include: (i) allocating, to a buffer, at least one from among an M (M is a natural number of 2 or greater) number of buffer units each capable of storing at least one of a plurality of L2P mapping units; (ii) receiving, from an external device, a mapping unit command requesting one or more target L2P mapping units from among the plurality of L2P mapping units; and (iii) storing the target L2P mapping units in the buffer before transmitting the target L2P mapping units to the external device in response to the mapping unit command.

When storing a first target L2P mapping unit from among the target L2P mapping units in the buffer, the storing the target L2P mapping units in the buffer may store the first target L2P mapping unit in a target buffer unit corresponding to the state value of the buffer among buffer units allocated to the buffer.

According to the embodiments of the disclosed technology, it is possible to minimize performance degradation caused due to a buffer and more efficiently manage L2P mapping units stored in the buffer.

DETAILED DESCRIPTION

Figure 1:
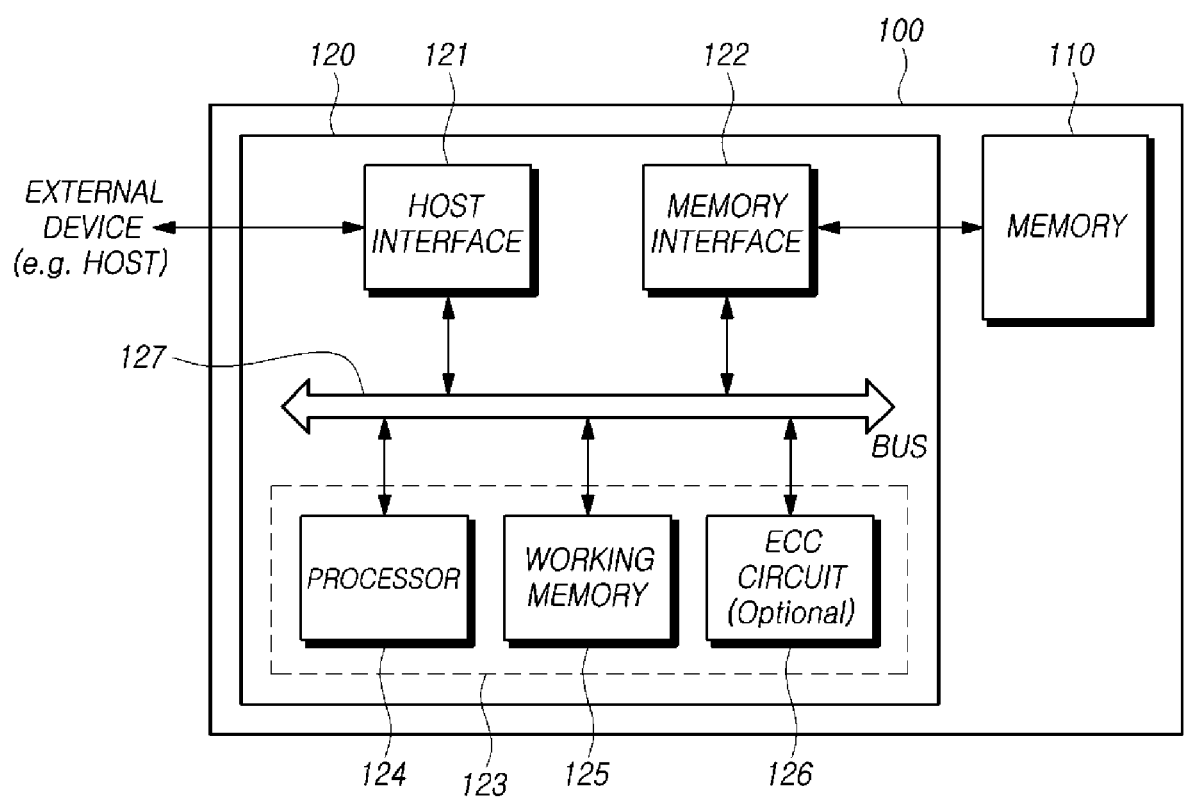
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 to be capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector that is uncorrectable in read data last. There may be one or more sectors that are determined to be uncorrectable. The error detection and correction circuit 126 may transfer information (e.g., address information) regarding a sector that is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
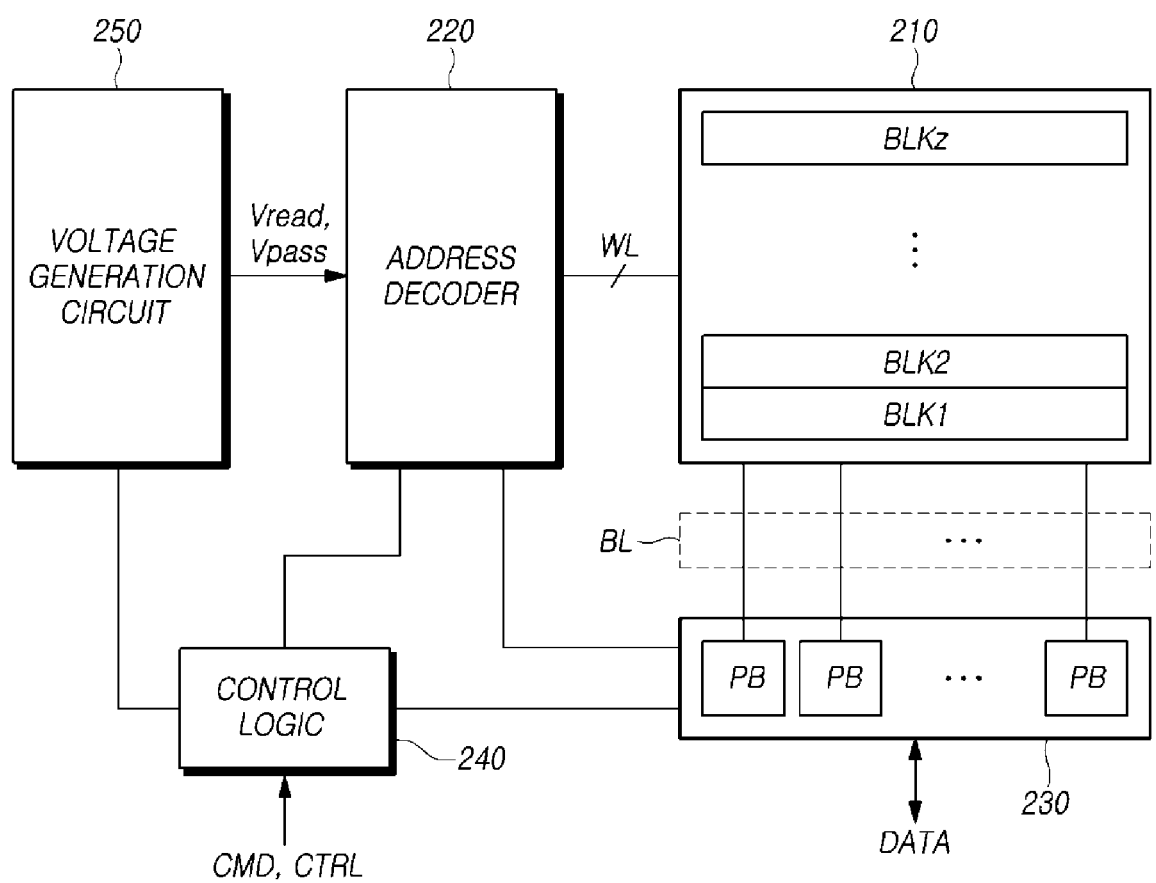
FIG. 2 is a block diagram schematically illustrating a memory of FIG. 1.

FIG. 2 is a block diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
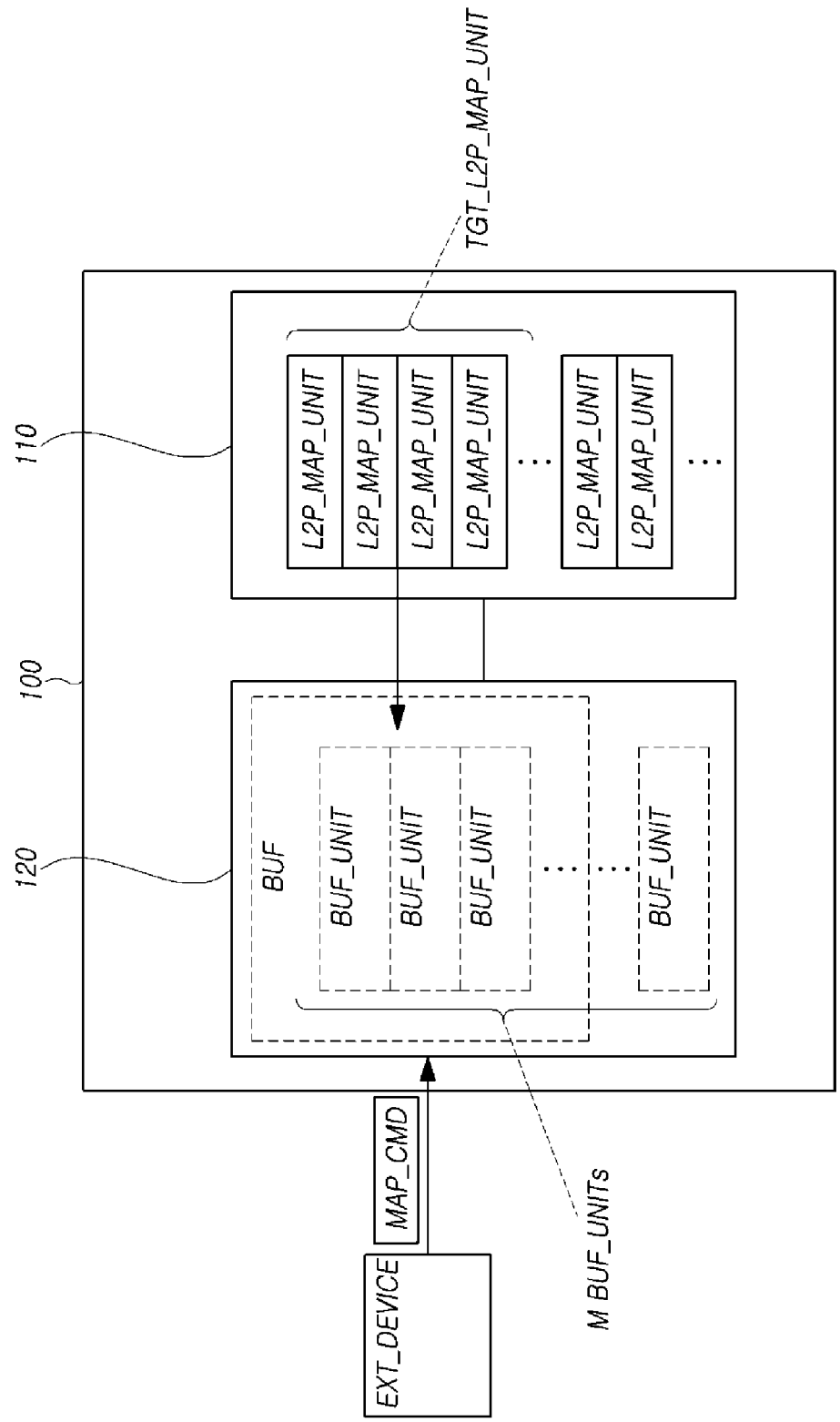
FIG. 3 is a diagram showing the schematic operation of a storage device according to an embodiment of the present disclosure.

FIG. 3 is a diagram showing the schematic operation of a storage device according to an embodiment of the present disclosure.

Referring to FIG. 3, a storage device 100 may include a memory 110 and a controller 120.

The memory 110 may store a plurality of logical-to-physical (L2P) mapping units L2P_MAP_UNIT. Each of the plurality of L2P mapping units L2P_MAP_UNIT may indicate the mapping relationship between a logical address section and a physical address section.

The sizes of a logical address section and a physical address section corresponding to one L2P mapping unit L2P_MAP_UNIT may be the same.

The size of a logical address section and a physical address section may be variously determined. For example, the size of a logical address section and a physical address section may be a multiple of the size (e.g., 4 KB) of a page included in the memory 110. For another example, the size of a logical address section and a physical address section may be the size of a memory block included in the memory 110.

One L2P mapping unit L2P_MAP_UNIT may include a plurality of sub L2P mapping units. Each of the plurality of sub L2P mapping units may indicate the mapping relationship between a logical address section and a physical address section of a specified size (e.g., 4 KB). Logical address sections corresponding to the plurality of sub L2P mapping units may be in consecutive order.

Each of the sub L2P mapping units may be configured by a pair of the start logical address of a logical address section and the start physical address of a physical address section.

For example, one L2P mapping unit L2P_MAP_UNIT may include 128 sub L2P mapping units, and each sub L2P mapping unit may indicate the mapping relationship between a 4 KB logical address section and a 4 KB physical address section. Each sub L2P mapping unit may be configured by a pair of a 4-byte logical address and a 4-byte physical address. Since the size of each sub L2P mapping unit is 8 bytes, the size of one L2P mapping unit L2P_MAP_UNIT may be 8*128 bytes=1 KB.

In another example, one L2P mapping unit L2P_MAP_UNIT may include 256 sub L2P mapping units, and each sub L2P mapping unit may indicate the mapping relationship between a 4 KB logical address section and a 4 KB physical address section. Each sub L2P mapping unit may be configured by a pair of a 4-byte logical address and a 4-byte physical address. Since the size of each sub L2P mapping unit is 8 bytes, the size of one L2P mapping unit L2P_MAP_UNIT may be 8*256 bytes=2 KB.

The controller 120 may dynamically allocate at least one of M (where M is a natural number of 2 or greater) number of buffer units BUF_UNIT to a buffer BUF. Each of the buffer units BUF_UNIT may store at least one of the plurality of L2P mapping units L2P_MAP_UNIT described above.

Each of the buffer units BUF_UNIT may be a memory region of a predetermined size (e.g., 32 KB) set in a volatile memory (e.g., the working memory 125) inside the controller 120. For example, each of the buffer units BUF_UNIT may be a part of a memory region allocated to a map cache that caches mapping information between logical addresses and physical addresses.

The controller 120 may receive a mapping unit command MAP_CMD, which requests one or more target L2P mapping units TGT_L2P_MAP_UNIT from among the plurality of L2P mapping units L2P_MAP_UNIT. The mapping unit command MAP_CMD may be received from an external device EXT_DEVICE located outside the storage device 100.

As a response to the mapping unit command MAP_CMD, the controller 120 may read target L2P mapping units TGT_L2P_MAP_UNIT from the memory 110 and transmit the target L2P mapping units TGT_L2P_MAP_UNIT to the external device EXT_DEVICE. In order to read data stored in the storage device 100 more quickly, the external device EXT_DEVICE may use the information mapping logical address sections and physical address sections stored in the target L2P mapping units TGT_L2P_MAP_UNIT.

Before transmitting the target L2P mapping units TGT_L2P_MAP_UNIT to the external device EXT_DEVICE, the controller 120 may store the target L2P mapping units TGT_L2P_MAP_UNIT in the buffer BUF.

The buffer BUF in the controller 120 may be entirely used only for storing target L2P mapping units TGT_L2P_MAP_UNIT. In such instances, however, if a separate volatile memory for the buffer BUF is required and added to the storage device 100, then the cost required to implement the storage device 100 increases.

Therefore, the controller 120 may allocate, for the buffer BUF, a part of a memory region located in a volatile memory inside the controller 120. In this case, as the size of the buffer BUF increases, the size of a memory region capable of being used by the controller 120 decreases, and as a result, the performance of the storage device 100 may degrade. Therefore, in order to minimize performance degradation due to increases in the use of the buffer BUF for storing target mapping units, it is necessary to efficiently manage the size of the buffer BUF.

Hereinafter, in an embodiment of the disclosed technology, a specific operation in which the controller 120 of the storage device 100 stores a plurality of target L2P mapping units TGT_L2P_MAP_UNIT in the buffer BUF will be described.

Figure 4:
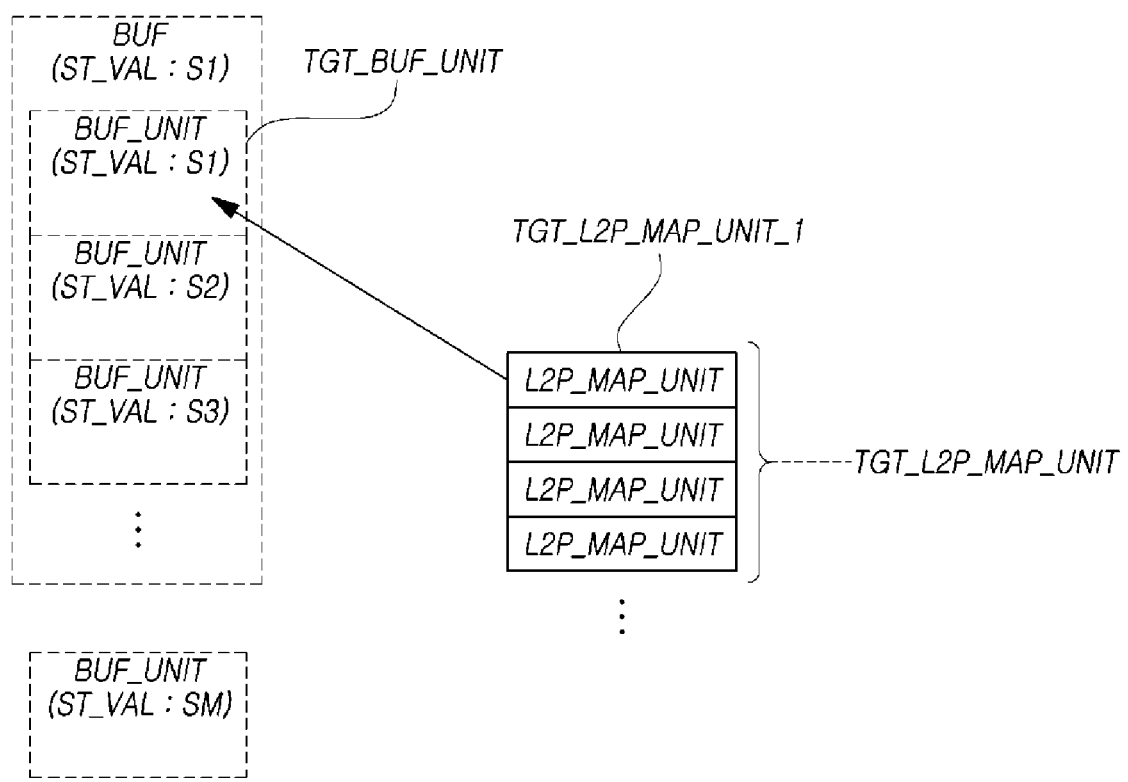
FIG. 4 is a diagram showing an example of an operation in which a storage device stores a first target L2P mapping unit in a buffer according to an embodiment of the present disclosure.

FIG. 4 is a diagram showing an example of an operation in which a storage device stores a first target L2P mapping unit in a buffer according to an embodiment of the present disclosure.

Referring to FIG. 4, a controller 120 of a storage device 100 may set a state value ST_VAL of a buffer BUF. The controller 120 may set the state value ST_VAL of the buffer BUF to one of M number of state values S1, S2, S3, . . . and SM, which respectively correspond to the above-described M number of buffer units BUF_UNIT.

In FIG. 4, the state values ST_VAL of buffer units BUF_UNIT included in the buffer BUF are S1, S2, S3, . . . . SM. The controller 120 may set S1, which is one of the state values, as the state value ST_VAL of the buffer BUF.

When storing a first target L2P mapping unit TGT_L2P_MAP_UNIT_1, from among the plurality of target L2P mapping units included in TGT_L2P_MAP_UNIT, in the buffer BUF, the controller 120 may store the first target L2P mapping unit TGT_L2P_MAP_UNIT_1 in a target buffer unit TGT_BUF_UNIT, from among the buffer units BUF_UNIT allocated to the buffer BUF.

In FIG. 4, the state value ST_VAL of the buffer BUF is set to S1. Accordingly, the controller 120 may set, as the target buffer unit TGT_BUF_UNIT, a buffer unit BUF_UNIT corresponding to the state value ST_VAL of S1, from among the buffer units BUF_UNIT allocated to the buffer BUF. The controller 120 may store the first target L2P mapping unit TGT_L2P_MAP_UNIT_1 in the target buffer unit TGT_BUF_UNIT. As a result, the state value ST_VAL of the buffer BUF may indicate the target buffer unit TGT_BUF_UNIT in which the first target L2P mapping unit TGT_L2P_MAP_UNIT_1 will be stored.

When the first target L2P mapping unit TGT_L2P_MAP_UNIT_1 cannot be stored in the target buffer unit TGT_BUF_UNIT, the controller 120 may change the target buffer unit TGT_BUF_UNIT. This change in target buffer unit will be described in detail with reference to FIG. 5.

Figure 5:
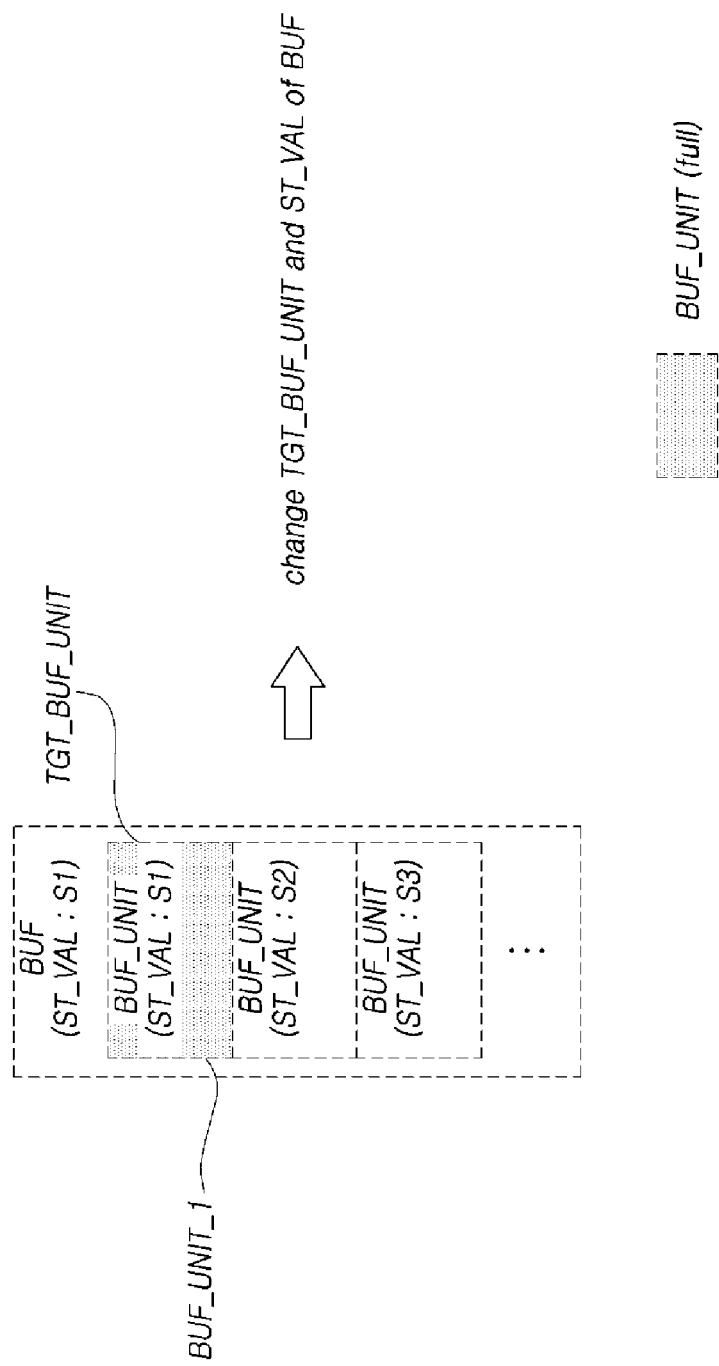
FIG. 5 is a diagram showing an operation in which a storage device changes a target buffer unit according to an embodiment of the present disclosure.

FIG. 5 is a diagram showing an operation in which a storage device changes a target buffer unit TGT_BUF_UNIT according to an embodiment of the present disclosure.

Referring to FIG. 5, a state value ST_VAL of a buffer BUF is S1, and among buffer units BUF_UNIT allocated to the buffer BUF, a first buffer unit BUF_UNIT_1 whose state value ST_VAL is S1 is set as the target buffer unit TGT_BUF_UNIT. The first buffer unit BUF_UNIT_1 is full.

When the first buffer unit BUF_UNIT_1 is full, L2P mapping units L2P_MAP_UNIT may be stored in the entire first buffer unit BUF_UNIT_1. Therefore, when the first buffer unit BUF_UNIT_1 is full, it cannot store an additional, new L2P mapping unit L2P_MAP_UNIT in the first buffer unit BUF_UNIT_1.

Therefore, in order to allow a new L2P mapping unit L2P_MAP_UNIT to be stored in the buffer BUF, the controller 120 may change the target buffer unit TGT_BUF_UNIT to a different target buffer unit, and may change the state value ST_VAL of the buffer BUF to the state value ST_VAL of a new target buffer unit TGT_BUF_UNIT.

In an embodiment of the disclosed technology, the controller 120 may change the target buffer unit TGT_BUF_UNIT from the first buffer unit BUF_UNIT_1 to a second buffer unit, selected from among the plurality of buffer units BUF_UNIT. This will be described in detail below with reference to FIGS. 6 and 7.

Figure 6:
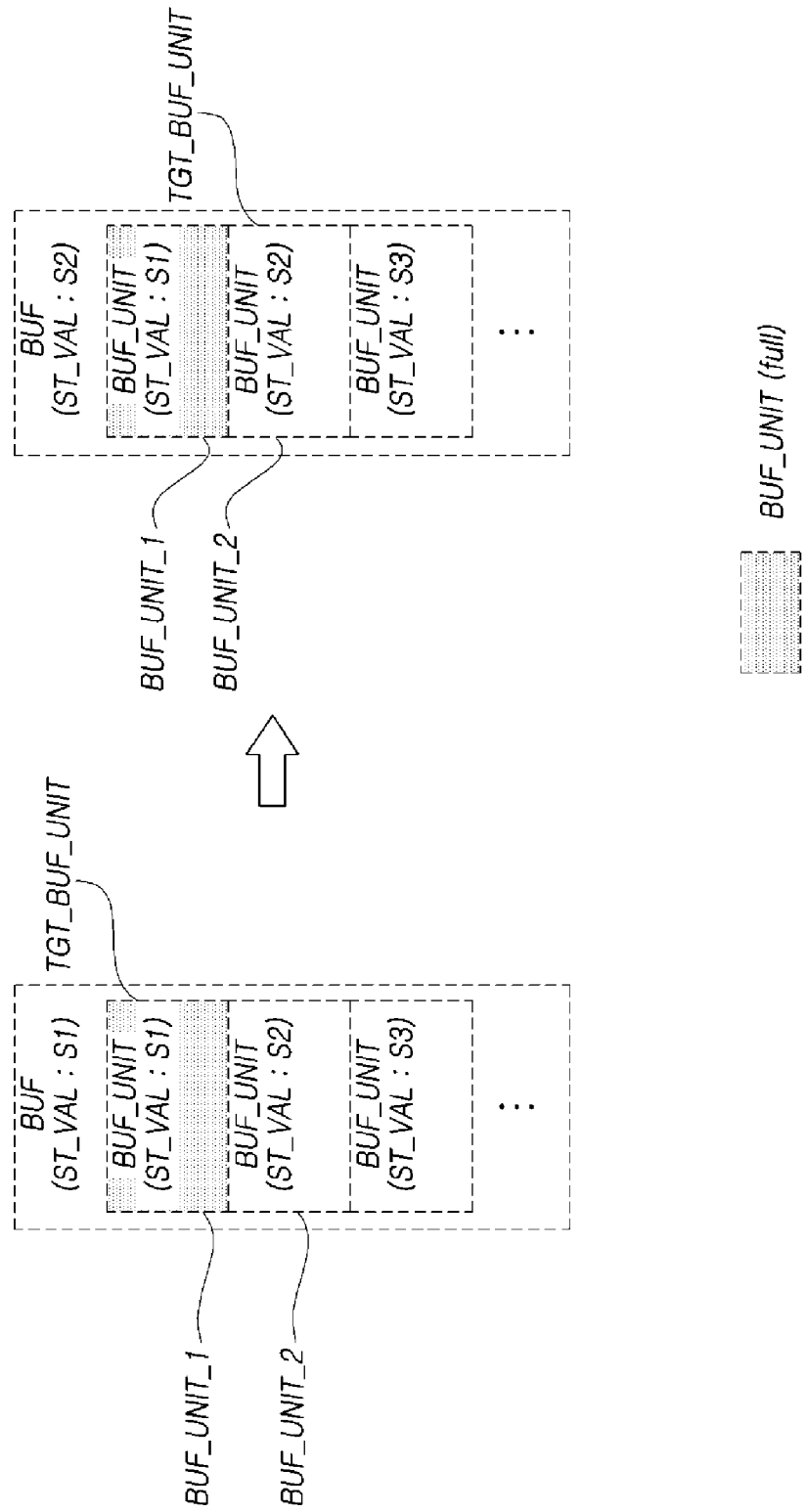
FIG. 6 is a diagram showing an example of an operation in which a storage device changes a second buffer unit to a target buffer unit according to an embodiment of the present disclosure.

FIG. 6 is a diagram showing an example of an operation in which a storage device changes a second buffer unit to a target buffer unit according to an embodiment of the present disclosure.

Referring to FIG. 6, a second buffer unit BUF_UNIT_2 corresponding to a state value ST_VAL of S2 is in a state in which it is already allocated to a buffer BUF together with a first buffer unit BUF_UNIT_1. In FIG. 6, when the state value ST_VAL of the buffer BUF is S1, a target buffer unit TGT_BUF_UNIT is the first buffer unit BUF_UNIT_1 corresponding to the state value ST_VAL of S1. The first buffer unit BUF_UNIT_1 is full, and the second buffer unit BUF_UNIT_2 is not full.

The controller 120 may change the target buffer unit TGT_BUF_UNIT from the first buffer unit BUF_UNIT_1 to the second buffer unit BUF_UNIT_2. Thereafter, the state value ST_VAL of the buffer BUF is set to S2, and an L2P mapping unit L2P_MAP_UNIT to be stored in the buffer BUF may be stored in the second buffer unit BUF_UNIT_2, which is now the target buffer unit TGT_BUF_UNIT.

Figure 7:
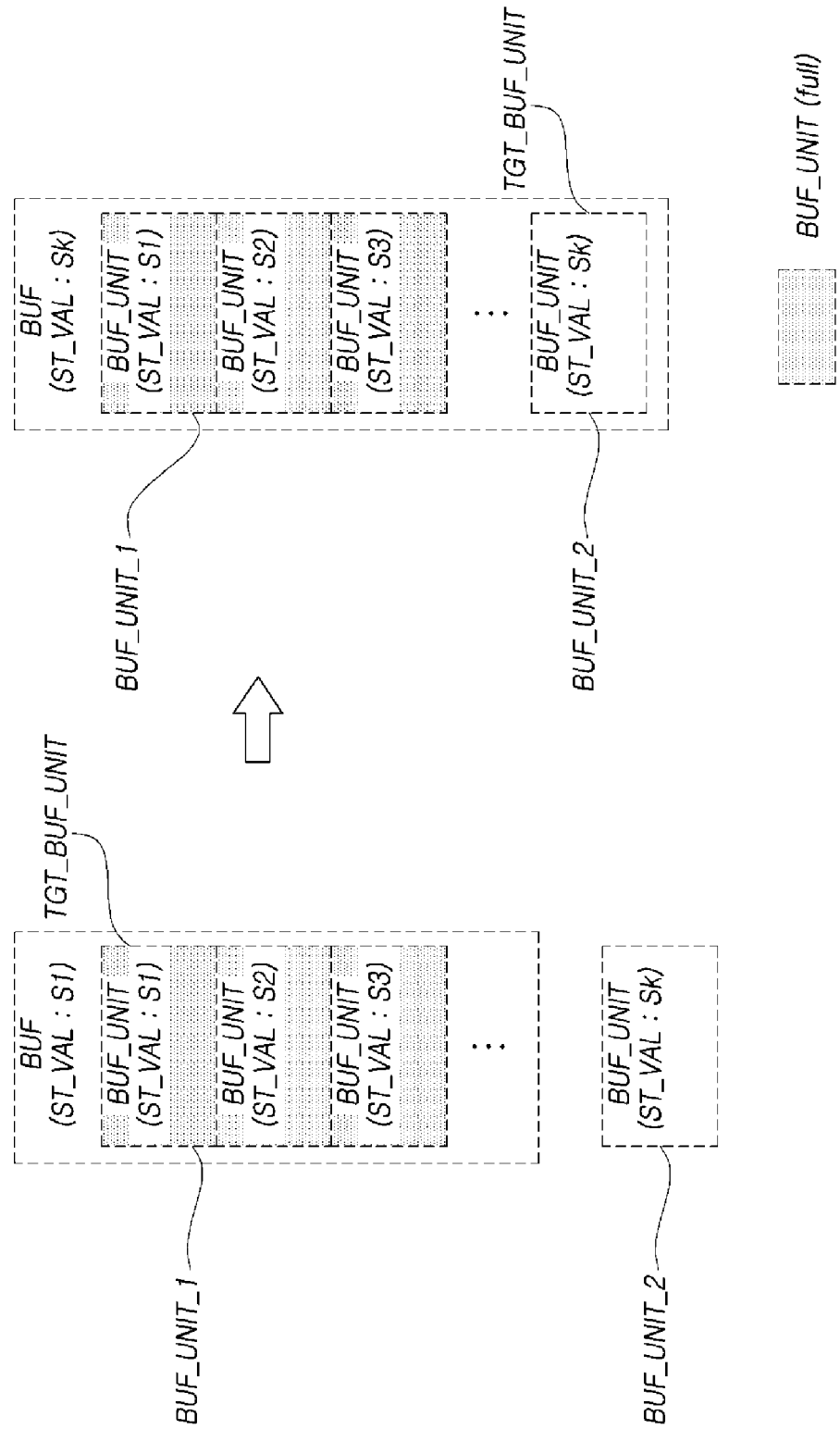
FIG. 7 is a diagram showing an example of another operation in which a storage device changes a second buffer unit to a target buffer unit according to an embodiment of the present disclosure.

FIG. 7 is a diagram showing an example of another operation in which a storage device changes a second buffer unit to a target buffer unit according to an embodiment of the present disclosure.

Referring to FIG. 7, a second buffer unit BUF_UNIT_2 corresponding to a state value ST_VAL of Sk is in a state in which it is not allocated to a buffer BUF. All buffer units BUF_UNIT allocated to the buffer BUF are full. Therefore, a buffer unit BUF_UNIT capable of storing a new L2P mapping unit L2P_MAP_UNIT does not exist in the buffer BUF.

Thus, the controller 120 may additionally allocate the second buffer unit BUF_UNIT_2 to the buffer BUF, and may change a target buffer unit TGT_BUF_UNIT from a first buffer unit BUF_UNIT_1 to the second buffer unit BUF_UNIT_2. Thereafter, the state value ST_VAL of the buffer BUF may be set to Sk, and a new L2P mapping unit L2P_MAP_UNIT may be stored in the second buffer unit BUF_UNIT_2.

L2P mapping units L2P_MAP_UNIT stored in the first buffer unit BUF_UNIT_1 described above may be deleted later. For example, after transmitting the L2P mapping units L2P_MAP_UNIT stored in the first buffer unit BUF_UNIT_1 to the external device EXT_DEVICE described above, the controller 120 may delete the L2P mapping units L2P_MAP_UNIT stored in the first buffer unit BUF_UNIT_1.

In this case, the controller 120 may evict the first buffer unit BUF_UNIT_1 from the buffer BUF, as will be described in detail with reference to FIG. 8.

Figure 8:
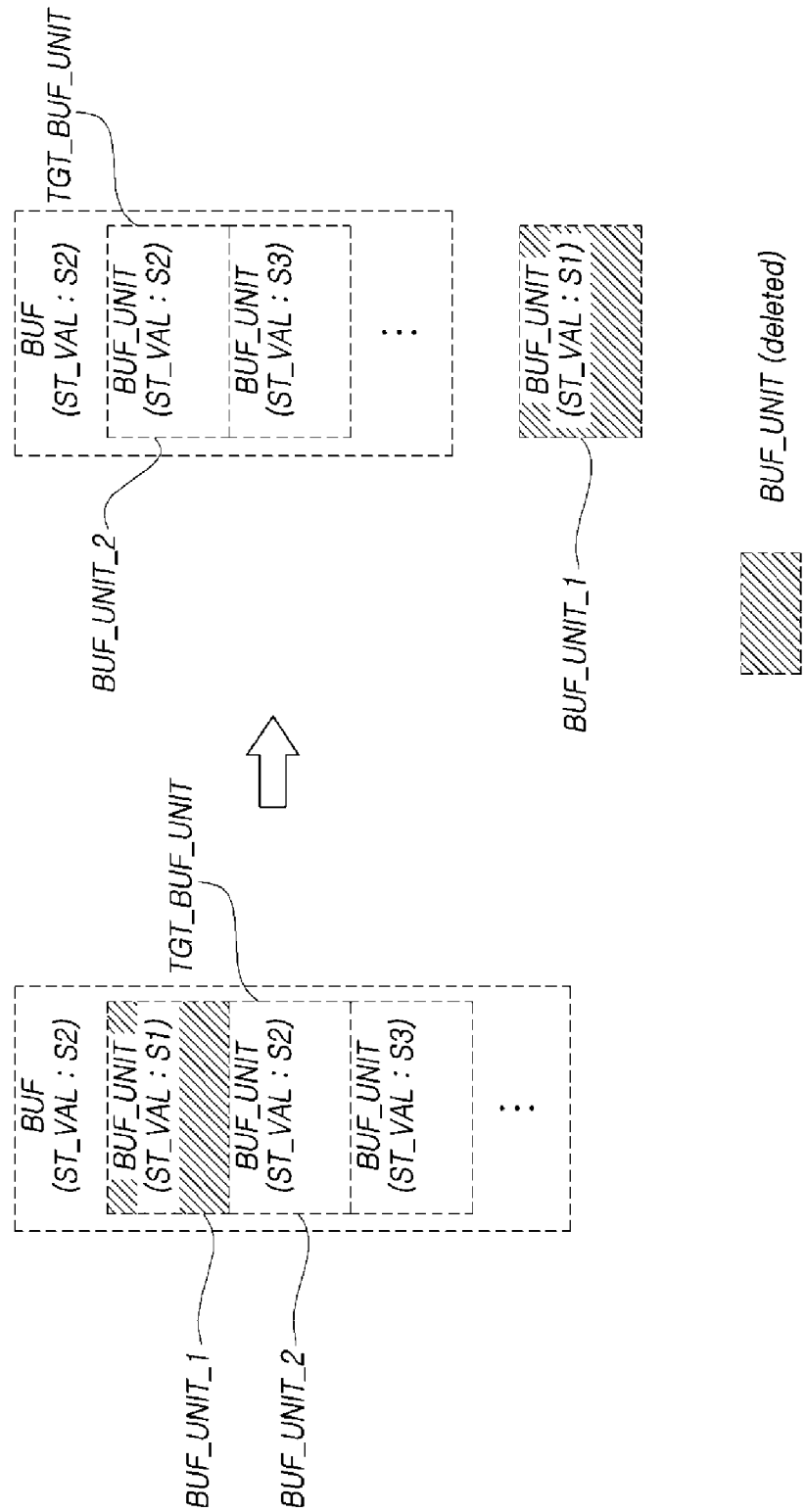
FIG. 8 is a diagram showing an example of an operation in which a storage device evicts a first buffer unit from a buffer according to an embodiment of the present disclosure.

FIG. 8 is a diagram showing an example of an operation in which a storage device evicts a first buffer unit from a buffer according to an embodiment of the present disclosure.

Referring to FIG. 8, a buffer BUF is in a state in which a state value ST_VAL of the buffer BUF is S2 and a target buffer unit TGT_BUF_UNIT is set to the second buffer unit BUF_UNIT_2 whose state value ST_VAL is S2.

When all L2P mapping units L2P_MAP_UNIT stored in the first buffer unit BUF_UNIT_1 are deleted, the controller 120 may evict the first buffer unit BUF_UNIT_1 from the buffer BUF. The controller 120 may use the evicted first buffer unit BUF_UNIT_1 for another use (e.g., a map cache), thereby improving the performance of the storage device 100.

An operation in which a controller 120 of a storage device 100 controls the buffer BUF has been described above.

As described above, target L2P mapping units TGT_L2P_MAP_UNIT may be stored in the buffer BUF. The controller 120 may use a separate data structure for accessing the target L2P mapping units TGT_L2P_MAP_UNIT stored in the buffer BUF.

Hereinafter, a pointer queue that is an example of the data structure for accessing the target L2P mapping units TGT_L2P_MAP_UNIT stored in the buffer BUF will be described.

Figure 9:
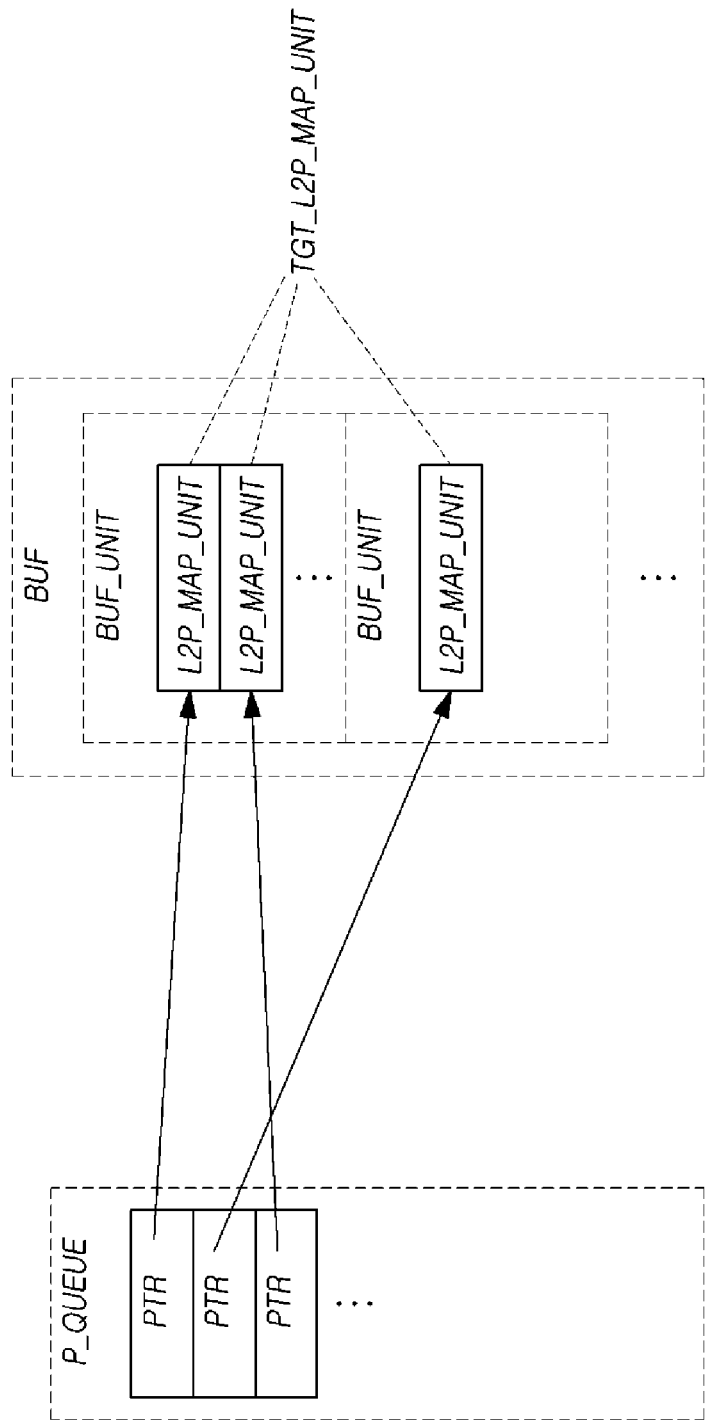
FIG. 9 is a diagram showing an example of a pointer queue according to an embodiment of the present disclosure.

FIG. 9 is a diagram showing an example of a pointer queue according to an embodiment of the present disclosure.

Referring to FIG. 9, a pointer queue P_QUEUE may queue pointers PTR for accessing target L2P mapping units TGT_L2P_MAP_UNIT stored in a buffer BUF.

A controller 120 may control the pointer queue P_QUEUE so that pointers that cover the maximum size of the buffer BUF may be queued in the pointer queue P_QUEUE.

Instead of sequentially accessing target L2P mapping units TGT_L2P_MAP_UNIT in the buffer BUF, the controller 120 may search for a pointer PTR queued in the pointer queue P_QUEUE and access the target L2P mapping unit TGT_L2P_MAP_UNIT indicated by the pointer PTR. Accordingly, the controller 120 may more quickly search for a specific target L2P mapping unit TGT_L2P_MAP_UNIT in the buffer BUF.

The order of pointers PTR queued in the pointer queue P_QUEUE and the order in which corresponding target L2P mapping units TGT_L2P_MAP_UNIT indicated by the pointers PTR are stored or deleted may be different from each other. Pointers PTR queued in the pointer queue P_QUEUE may be managed in a first-in first-out (FIFO) manner, but the order in which target L2P mapping units TGT_L2P_MAP_UNIT are deleted may be random.

When a first target L2P mapping unit TGT_L2P_MAP_UNIT_1, from among target L2P mapping units TGT_L2P_MAP_UNIT, is newly stored in the buffer BUF or is deleted from the buffer BUF, the pointer queue P_QUEUE may be changed as well, as will be described below in detail with reference to FIGS. 10 and 11.

Figure 10:
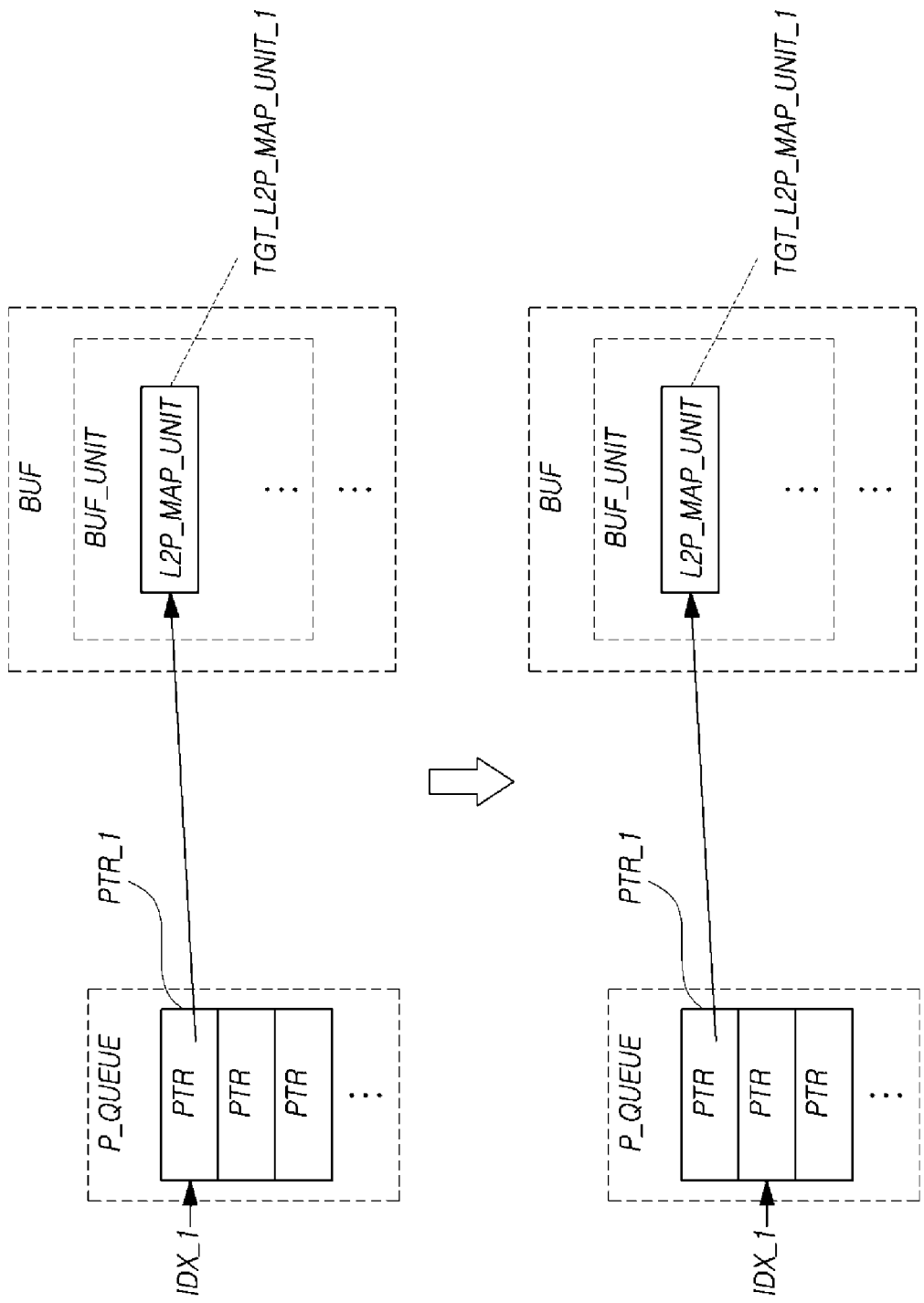
FIG. 10 is a diagram showing an example of an operation in which a storage device updates a first index according to an embodiment of the present disclosure.

FIG. 10 is a diagram showing an example of an operation in which a storage device updates a first index according to an embodiment of the present disclosure.

Referring to FIG. 10, when storing a first target L2P mapping unit TGT_L2P_MAP_UNIT_1 in a buffer BUF, a controller 120 of a storage device 100 may set a first pointer PTR_1 indicated by a first index IDX_1 among pointers PTR queued in a pointer queue P_QUEUE to indicate a location where the first target L2P mapping unit TGT_L2P_MAP_UNIT_1 will be stored in the buffer BUF. The controller 120 may store the first target L2P mapping unit TGT_L2P_MAP_UNIT_1 at the location indicated by the first pointer PTR_1.

In an embodiment, the first index IDX_1 may be used to determine which pointer, from among the pointers PTR queued in the pointer queue P_QUEUE, to indicate the location of the first target L2P mapping unit TGT_L2P_MAP_UNIT_1 to be newly stored in the buffer BUF.

Thereafter, the controller 120 may update the first index IDX_1. For example, the controller 120 may update the first index IDX_1 so that the first index IDX_1 subsequently indicates the next pointer as the first pointer PTR_1 in the pointer queue P_QUEUE.

Figure 11:
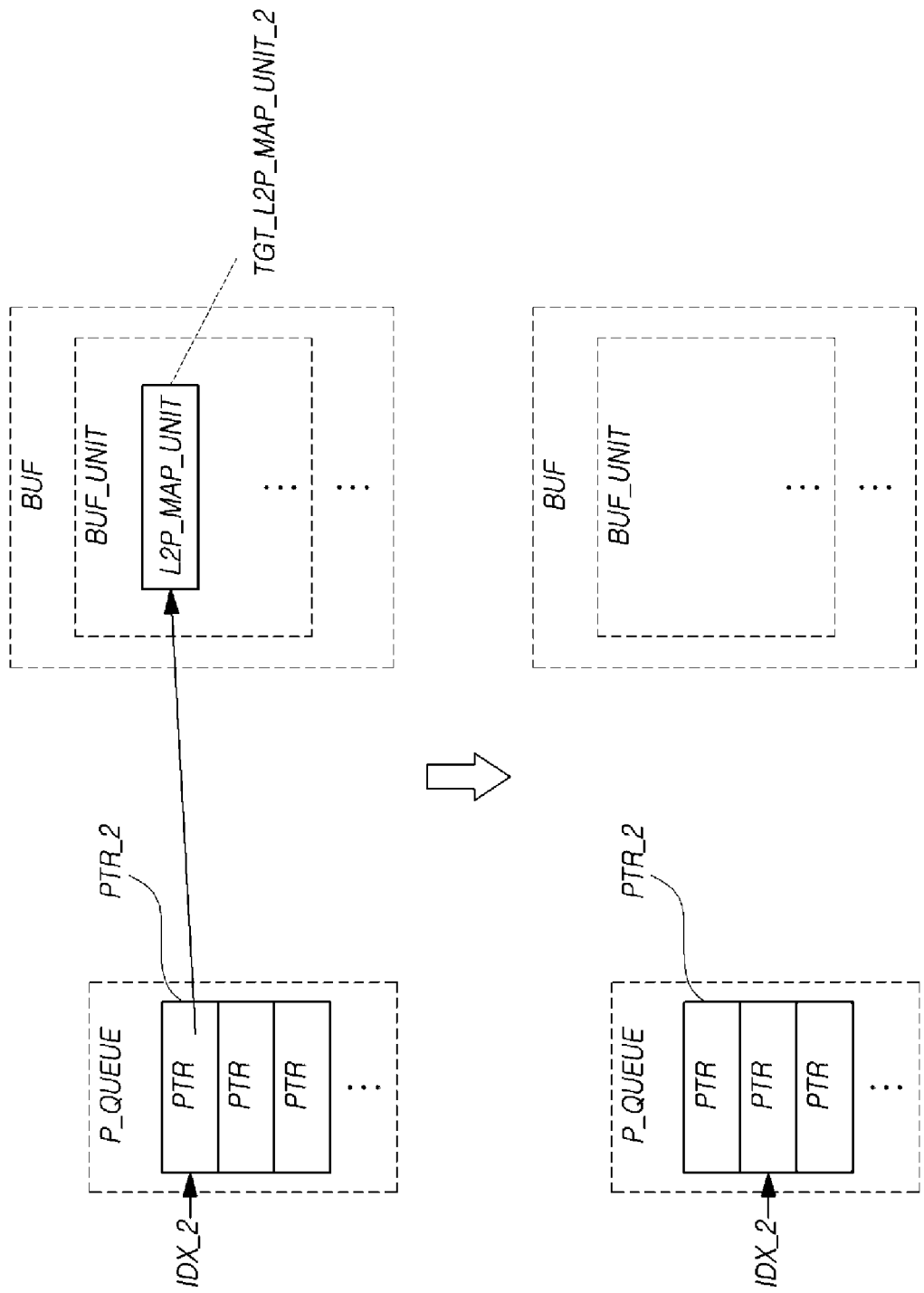
FIG. 11 is a diagram showing an example of an operation in which a storage device updates a second index according to an embodiment of the present disclosure.

FIG. 11 is a diagram showing an example of an operation in which a storage device updates a second index according to an embodiment of the present disclosure.

Referring to FIG. 11, a controller 120 of a storage device 100 may remove, from a buffer BUF, a second target L2P mapping unit TGT_L2P_MAP_UNIT_2. The second target L2P mapping unit TGT_L2P_MAP_UNIT_2 may be indicated by a second pointer PTR_2, from among pointers PTR queued in a pointer queue P_QUEUE. The second pointer PTR_2 may in turn be indicated by a second index IDX_2. For example, if the pointer queue P_QUEUE is in a state in which it is full, then the controller 120 may remove, from the buffer BUF, the second target L2P mapping unit TGT_L2P_MAP_UNIT_2 indicated by the second pointer PTR_2 corresponding to the second index IDX_2. In an embodiment, the second index IDX_2 may be used to determine which L2P mapping unit L2P_MAP_UNIT to delete when deleting one L2P mapping unit L2P_MAP_UNIT from the buffer BUF.

Thereafter, the controller 120 may update the second index IDX_2. For example, the controller 120 may update the second index IDX_2 so that the second index IDX_2 indicates that a next pointer is the second pointer PTR_2.

Figure 12:
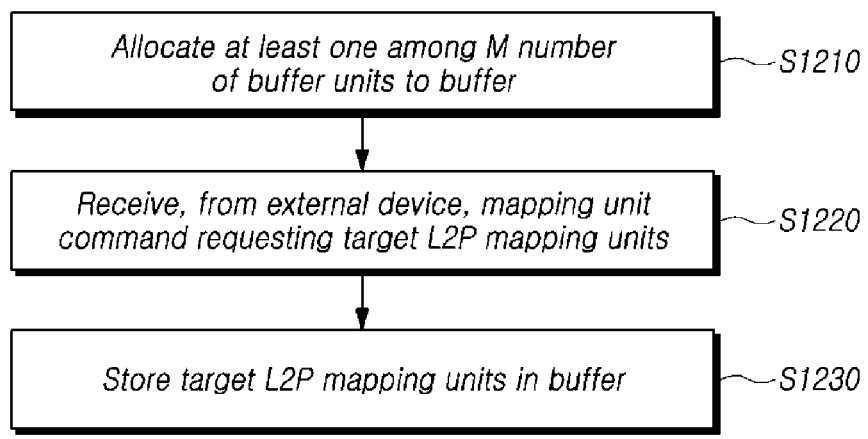
FIG. 12 is a diagram showing a method for operating a storage device according to an embodiment of the present disclosure.

FIG. 12 is a diagram showing a method for operating a storage device according to an embodiment of the present disclosure.

Referring to FIG. 12, a method for operating a storage device 100 may include step S1210 of allocating at least one of M (where M is a natural number of 2 or greater) number of buffer units BUF_UNIT to a buffer BUF. Each of the M number of buffer units BUF_UNIT may store at least one of a plurality of L2P mapping units L2P_MAP_UNIT. Each of the plurality of L2P mapping units L2P_MAP_UNIT may indicate a mapping relationship between a logical address section and a physical address section.

The state value of the buffer BUF may be one of M number of state values corresponding to the M number of buffer units BUF_UNIT, respectively.

The method for operating the storage device 100 may include step S1220 of receiving, from the external device EXT_DEVICE, the command MAP_CMD requesting one or more target L2P mapping units TGT_L2P_MAP_UNIT, from among the plurality of L2P mapping units L2P_MAP_UNIT.

The method for operating the storage device 100 may include step S1230 of storing the target L2P mapping units TGT_L2P_MAP_UNIT in the buffer BUF before transmitting the target L2P mapping units TGT_L2P_MAP_UNIT to the external device EXT_DEVICE. In the step S1230, when storing a first target L2P mapping unit TGT_L2P_MAP_U-NIT_1, from among the target L2P mapping units TGT_L2P_MAP_UNIT in the buffer BUF, the first target L2P mapping unit TGT_L2P_MAP_UNIT_1 may be stored in a target buffer unit TGT_BUF_UNIT corresponding to the state value ST_VAL of the buffer BUF.

In the step S1230, when a first buffer unit BUF_UNIT_1 among the buffer units BUF_UNIT allocated to the buffer BUF is the target buffer unit TGT_BUF_UNIT, and the first buffer unit BUF_UNIT_1 is full, the target buffer unit TGT_BUF_UNIT may be revised from the first buffer unit BUF_UNIT_1 to a second buffer unit BUF_UNIT_2. The state value ST_VAL of the buffer BUF may be changed to the state value ST_VAL of second buffer unit BUF_UNIT_2, which is the new target buffer unit TGT_BUF_UNIT.

For example, when the second buffer unit BUF_UNIT_2 is in a state in which it is already allocated to the buffer BUF, the target buffer unit TGT_BUF_UNIT may be changed from the first buffer unit BUF_UNIT_1 to the second buffer unit BUF_UNIT_2. The second buffer unit BUF_UNIT_2 is not full.

In another example, when all buffer units BUF_UNIT allocated to the buffer BUF are full, a second buffer unit BUF_UNIT_2 may be additionally allocated to the buffer BUF, and the target buffer unit TGT_BUF_UNIT may be changed from the first buffer unit BUF_UNIT_1 to the second buffer unit BUF_UNIT_2.

The method for operating the storage device 100 may further include step of evicting the first buffer unit BUF_UNIT_1 from the buffer BUF when all L2P mapping units L2P_MAP_UNIT stored in the first buffer unit BUF_UNIT_1 are deleted, after the target buffer unit TGT_BUF_UNIT is changed.

The step S1230 may include (i) a step of searching for a first pointer PTR_1 indicated by a first index IDX_1 in a pointer queue P_QUEUE in which pointers PTR for accessing the target L2P mapping units TGT_L2P_MAP_UNIT (stored in the buffer BUF) are queued; (ii) a step of setting the first pointer PTR_1 to indicate a location where a first target L2P mapping unit TGT_L2P_MAP_UNIT_1 will be stored in the buffer BUF, and (iii) a step of updating the first index IDX_1 to indicate that the next pointer is the first pointer PTR_1.

The method for operating the storage device 100 may further include: (i) a step of removing, from the buffer BUF, a second target L2P mapping unit TGT_L2P_MAP_UNIT_2 indicated by a second pointer PTR_2 indicated by a second index IDX_2, from among the pointers PTR queued in the pointer queue P_QUEUE; and (ii) a step of updating the second index IDX_2 to indicate that the next pointer is set as the second pointer PTR_2.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
    a memory configured to store a plurality of L2P (logical-to-physical) mapping units, each indicating a mapping relationship between a logical address section and a physical address section; and
    a controller configured to dynamically allocate, to a buffer, at least one from among an M number of buffer units, each buffer unit capable of storing at least one of the plurality of L2P mapping units, and configured to store one or more target L2P mapping units, from among the plurality of L2P mapping units, in the buffer before transmitting the target L2P mapping units to an external device, when the controller receives a mapping unit command requesting the target L2P mapping units from the external device,
    wherein the controller sets a state value of the buffer to one of an M number of state values respectively corresponding to the M number of buffer units, and, when storing a first target L2P mapping unit from among the target L2P mapping units in the buffer, stores the first target L2P mapping unit in a target buffer unit corresponding to the state value of the buffer, and
    wherein M is a natural number of 2 or greater.

2. The storage device according to claim 1, wherein, when a first buffer unit, from among buffer units previously allocated to the buffer, is the target buffer unit and the first buffer unit is full, the controller changes the target buffer unit from the first buffer unit to a second buffer unit, from among the M number of buffer units, and changes the state value of the buffer to a state value of the second buffer unit.

3. The storage device according to claim 2, wherein
when the second buffer unit is in a state in which it is previously allocated to the buffer, the controller changes the target buffer unit from the first buffer unit to the second buffer unit, and
the second buffer unit is not full.

4. The storage device according to claim 2, wherein, when all buffer units allocated to the buffer are full, the controller additionally allocates the second buffer unit to the buffer, and changes the target buffer unit from the first buffer unit to the second buffer unit.

5. The storage device according to claim 2, wherein, when all L2P mapping units stored in the first buffer unit are deleted after the target buffer unit is changed, the controller evicts the first buffer unit from the buffer.

6. The storage device according to claim 1, wherein
the controller controls a pointer queue that stores queued pointers for accessing the target L2P mapping units in the buffer,
when storing the first target L2P mapping unit in the buffer, the controller sets a first pointer indicated by a first index, from among the pointers queued in the pointer queue, to indicate a location where the first target L2P mapping unit is to be stored in the buffer, and
the controller updates the first index to indicate a next pointer as the next first pointer.

7. The storage device according to claim 6, wherein
the controller removes, from the buffer, a second target L2P mapping unit indicated by a second pointer indicated by a second index, from among the pointers queued in the pointer queue, and
the controller updates the second index to indicate a next pointer as the next second pointer.

8. A method for operating a storage device, comprising:
allocating, to a buffer, at least one from among an M number of buffer units each capable of storing at least one of a plurality of L2P (logical-to-physical) mapping units;
receiving, from an external device, a mapping unit command requesting one or more target L2P mapping units from among the plurality of L2P mapping units; and
storing the target L2P mapping units in the buffer before transmitting the target L2P mapping units to the external device in response to the mapping unit command,
wherein each of the plurality of L2P mapping units indicates a mapping relationship between a logical address section and a physical address section,
wherein a state value of the buffer is one of an M number of state values corresponding to the M number of buffer units, respectively,
wherein, when storing a first target L2P mapping unit from among the target L2P mapping units in the buffer, the first target L2P mapping unit is stored in a target buffer unit corresponding to the state value of the buffer, from among buffer units allocated to the buffer, and
wherein M is a natural number of 2 or greater.

9. The method according to claim 8, wherein, when a first buffer unit, from among buffer units allocated to the buffer, is the target buffer unit and the first buffer unit is full, the target buffer unit changes from the first buffer unit to a second buffer unit, from among the M number of buffer units, and the state value of the buffer changes to a state value of the changed target buffer unit.

10. The method according to claim 9, wherein
when the second buffer unit is previously allocated to the buffer, the target buffer unit changes from the first buffer unit to the second buffer unit when the storing the target L2P mapping units, and
the second buffer unit is not full.

11. The method according to claim 9, wherein, when all buffer units allocated to the buffer are full, the second buffer unit is additionally allocated to the buffer and the target buffer unit changes from the first buffer unit to the second buffer unit when storing the target L2P mapping units in the buffer.

12. The method according to claim 9, further comprising:
evicting, when all L2P mapping units stored in the first buffer unit are deleted after the target buffer unit is changed, the first buffer unit from the buffer.

13. The method according to claim 8, wherein the storing the target L2P mapping units in the buffer comprises:
searching for a first pointer indicated by a first index in a pointer queue in which pointers for accessing target L2P mapping units stored in the buffer are queued;
setting the first pointer to indicate a location where the first target L2P mapping unit is to be stored in the buffer; and
updating the first index to indicate the next pointer as the next first pointer.

14. The method according to claim 13, further comprising:
removing, from the buffer, a second target L2P mapping unit indicated by a second pointer indicated by a second index among the pointers queued in the pointer queue; and
updating the second index to indicate a next pointer as the next second pointer.

* * * * *